Sept. 22, 1931.    H. A. KNOX    1,824,086
SUSPENSION FOR TRACKLAYING VEHICLES
Filed May 18, 1927    2 Sheets-Sheet 1
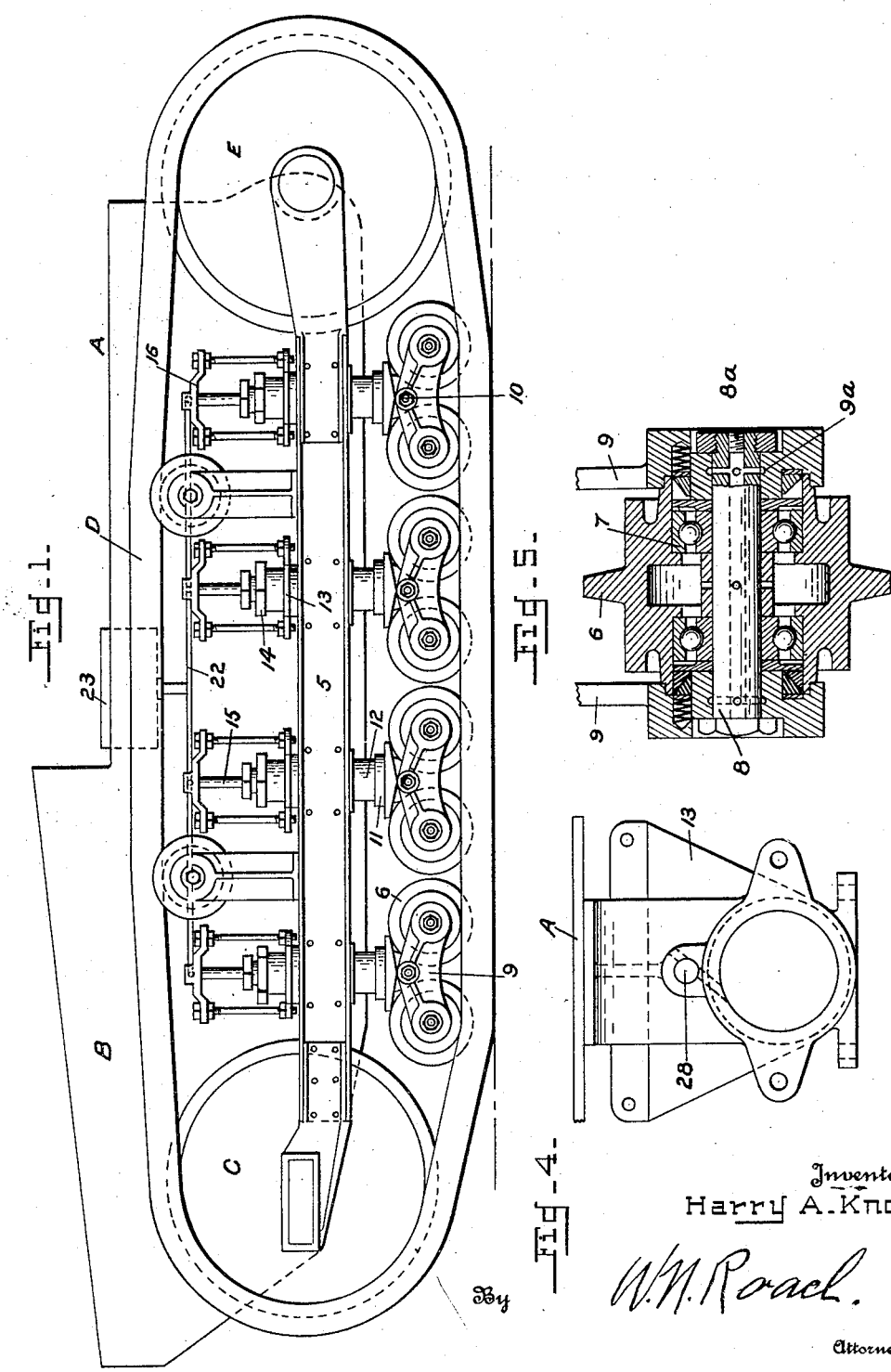
Inventor
Harry A. Knox
By W. N. Roach.
Attorney Sept. 22, 1931. H. A. KNOX 1,824,086
SUSPENSION FOR TRACKLAYING VEHICLES
Filed May 18, 1927 2 Sheets-Sheet 2
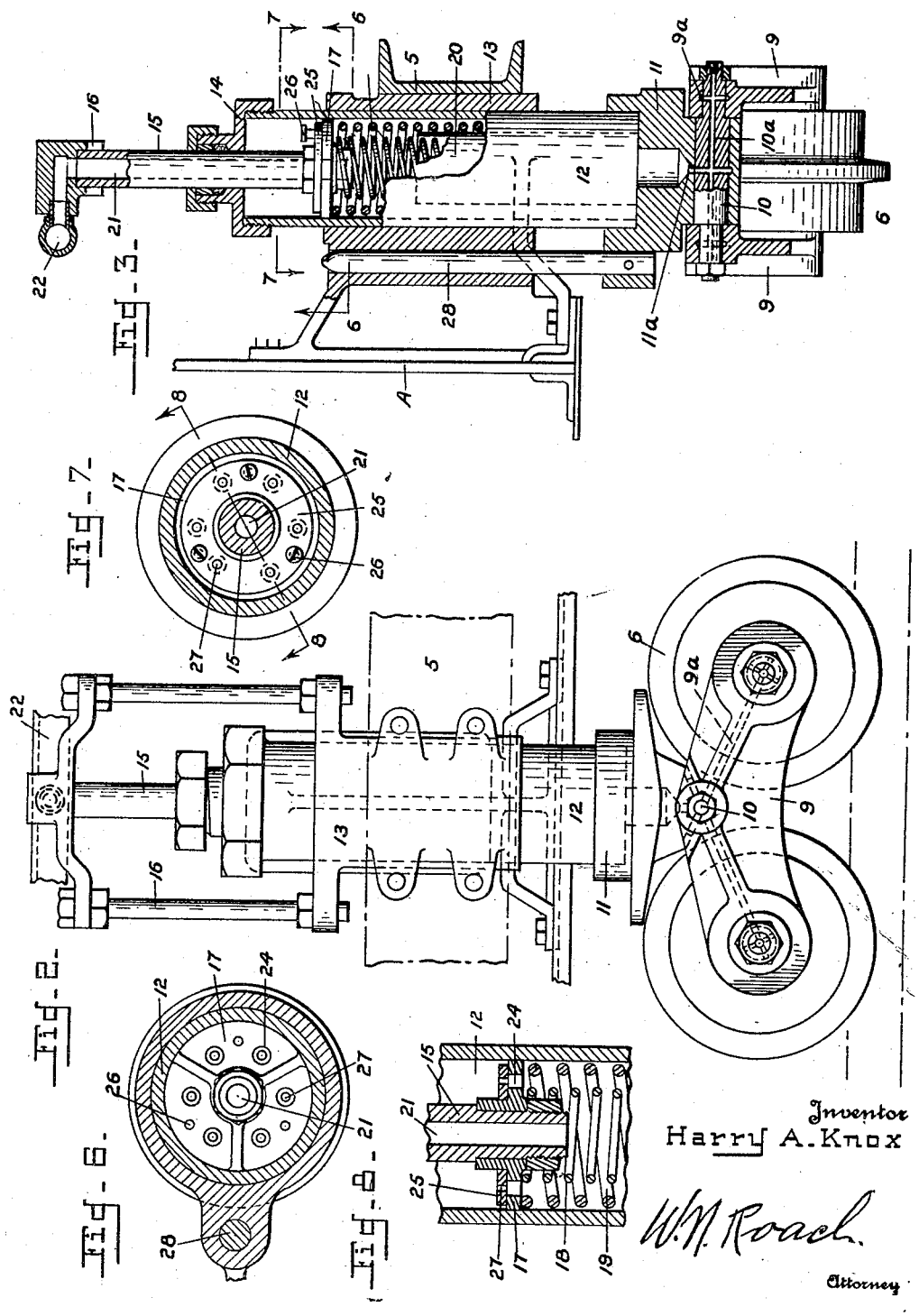
Inventor
Harry A. Knox
W.M. Roach
Attorney Patented Sept. 22, 1931

1,824,086

UNITED STATES PATENT OFFICE

HARRY A. KNOX, OF DAVENPORT, IOWA

SUSPENSION FOR TRACKLAYING VEHICLES

Application filed May 13, 1927. Serial No. 192,422.

(GRANTED UNDER THE ACT OF MARCH 3, 1883, AS AMENDED APRIL 30, 1928; 370 O. G. 757)

This invention described herein may be manufactured and used by or for the Government for governmental purposes without the payment to me of any royalty thereon.

The subject of this invention is a suspension for track laying vehicles.

In vehicles of the track laying type wherein the supporting roller units are yieldingly connected to the body there is present an excessive propensity towards rocking or "galloping" and this movement under certain conditions of terrain becomes so intensive and persistent that the crew manning the vehicle are afflicted with nausea.

Accordingly it is proposed in the present invention to eliminate the rebounding action of the spring suspension by associating therewith a hydraulic check which may be utilized to lubricate the supporting units.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a track laying vehicle embodying the invention.

Fig. 2 is a detail view in side elevation of one of the supporting units.

Fig. 3 is a longitudinal sectional view through a unit.

Fig. 4 is a plan view of the bracket.

Fig. 5 is a sectional view through one of track rollers;

Fig. 6 is a section on the line 6—6 of Fig. 3;

Fig. 7 is a section on the line 7—7 of Fig. 3; and

Fig. 8 is a section on the line 8—8 of Fig. 7.

Referring to the drawings by numerals of reference:

The vehicle consists of the usual main frame A carrying a power plant B and having a suitable transmission to the drive sprocket C for driving a pair of endless tracks D about the front idlers E.

Secured at each side of the main frame and spaced therefrom is a beam 5 constituting therewith a suspension frame which is supported through yielding connections by a plurality of sets of rollers 6 arranged in series on each track, each set consisting of a pair of successive rollers mounted for either angular or combined vertical movement and forming an independent unit following the endless track.

As the units are identical, only one will be described.

The rollers are mounted through ball bearings 7 on axles 8 journaled in the extremities of bent arms 9 which are mounted for angular movement about a spindle 10. The spindle is carried in the base 11 of a cylindrical column 12 which is guided during its vertical displacement by a bracket 13 secured to the main frame A and the beam 5.

Inserted through the head 14 of the cylinder is a piston 15 carried by a yoke 16 rigidly attached to the bracket 13. Within the cylinder and confined between the base and the piston head 17 are yielding elements, specifically an inner helical spring 18 and an outer spring 19, separated by a spacer sleeve 20.

The piston rod is formed with a central passage 21 which is in communication with a supply pipe 22 leading from a pressure tank 23 containing a fluid lubricant. The lubricant from the tank is free to flow through the piston entering the cylinder below the piston head. The piston head is provided with ports 24 and carries on its upper face a valve 25 mounted on headed guide pins 26 and having parts 27 overlying the ports 24.

When the supporting roller unit encounters an obstruction it will be moved upwardly against the action of the springs 18 and 19 and this displacement will cause the lubricant to enter the chamber on the upper side of the piston head passing through the ports 24 and by raising the valve 25 have unobstructed admission. On the downward stroke of the cylinder, the valve 25 will be seated and the throttling of the lubricant through the small ports 27 will insure an even restoration of the springs and maintain the vehicle on an even keel. Movement of the cylinder is limited by the projecting base 11 and the head 14 which may respectively encounter the lower and upper edges of the bracket. A guide rod 28 carried by the base of the cylinder is disposed in an aperture in the bracket and serves an obvious purpose.

Inasmuch as the supporting rollers of track-laying vehicles are frequently obliged to operate while submerged in mud or water the packing of bearings presents a difficult problem. In order to utilize the lubricant of the suspension system for a packing the spindle 10, arms 9 and axles 8 are provided with intersecting passages respectively 10a, 9a, and 8a, the former establishing communication with the supply through the passage 11a in the base of the column. Pressure may be developed and maintained in the tank 23 in any suitable manner and the lubricant thus forced into the bearings will effectively prevent incursion of foreign matter.

I claim:

1. A suspension for track laying vehicles embodying a frame, brackets secured to the frame, a supporting unit in each bracket including a vertically movable cylinder, a transverse spindle at the base of the cylinder and having a fluid passage in communication therewith, arms having a fluid passage centrally pivoted on the spindle, rollers mounted at the extremities of the arms, a yoke on the bracket, a piston fixed to the yoke and working in the cylinder, springs within the cylinder and confined between its base and the piston head, means for admitting a lubricating fluid to the cylinder, and means for throttling the fluid through the piston head during the downward stroke of the cylinder.

2. A suspension for track laying vehicles embodying a frame, brackets secured to the frame, a supporting unit in each bracket including a cylinder vertically movable in the bracket, a transverse spindle at the base of the cylinder, arms centrally pivoted on the spindle, rollers mounted at the extremities of the arms, a yoke on the bracket, a piston fixed to the yoke and working in the cylinder, springs within the cylinder and confined between its base and the piston head, means for admitting a fluid to the cylinder, and means for throttling the fluid through the piston head during the downward stroke of the cylinder.

3. A suspension for track laying vehicles embodying a frame, brackets secured to the frame, a supporting unit in each bracket including a cylinder vertically movable therein, a traction element carried at the base of the cylinder, a fixed piston carried by the bracket and working in the cylinder springs within the cylinder and confined between its base and the piston head, means for admitting a fluid to the cylinder and means for throttling the fluid through the piston head during the downward stroke of the cylinder.

4. A suspension for track laying vehicles embodying a frame, mobile supports for the frame, each having fluid communication means through all of its elements, a spring suspension unit for each support, a fluid shock absorbing mechanism associated with a suspension unit and having access to the fluid communication means of a mobile support, and means for admitting the fluid of the shock absorbing mechanism under pressure to the support.

5. A suspension for track laying vehicles embodying a frame, mobile supports for the frame, each having fluid communication means through all of its elements, a spring suspension unit for each support, a fluid shock absorbing mechanism associated with a suspension unit and having access to the fluid communication means of a mobile support and means for admitting the fluid of the shock absorbing mechanism to the support.

6. In a vehicle, a spring suspension, traction elements, a fluid shock absorbing unit for the suspension having fluid communication with the bearings of the traction elements and means for supplying lubricating fluid to the shock absorbing unit.

7. In a vehicle, a spring suspension, traction elements, and a fluid shock absorbing unit for the suspension, having fluid communication with the bearings of the traction elements.

HARRY A. KNOX.